United States Patent
Bandemer et al.

(10) Patent No.: US 7,706,469 B2
(45) Date of Patent: Apr. 27, 2010

(54) PRECODING METHOD FOR TRANSMITTING INFORMATION IN A MIMO RADIO SYSTEM

(75) Inventors: Bernd Bandemer, Marlishausen (DE); Samuli Visuri, Helsinki (FI)

(73) Assignee: Nokia Corporation, Espoo (FI)

( * ) Notice: Subject to any disclaimer, the term of this patent is extended or adjusted under 35 U.S.C. 154(b) by 968 days.

(21) Appl. No.: 11/472,504

(22) Filed: Jun. 21, 2006

(65) Prior Publication Data

US 2007/0254607 A1 Nov. 1, 2007

(30) Foreign Application Priority Data

Apr. 28, 2006 (FI) .................................. 20065278

(51) Int. Cl.
*H03K 9/00* (2006.01)
(52) U.S. Cl. ...................... 375/316; 375/260; 375/233; 375/259; 375/347; 375/267; 455/101; 455/562.1
(58) Field of Classification Search ................. 375/259, 375/260, 267, 347, 316, 233; 455/101, 562.1
See application file for complete search history.

(56) References Cited

U.S. PATENT DOCUMENTS

| | | | | |
|---|---|---|---|---|
| 7,260,153 | B2 * | 8/2007 | Nissani | 375/259 |
| 7,433,402 | B2 * | 10/2008 | Al-Dhahir et al. | 375/233 |
| 7,526,036 | B2 * | 4/2009 | Mehta et al. | 375/260 |
| 2003/0043929 | A1 | 3/2003 | Sampath | |
| 2003/0185310 | A1 | 10/2003 | Ketchum et al. | |
| 2007/0174038 | A1 * | 7/2007 | Wang et al. | 704/1 |
| 2007/0191066 | A1 * | 8/2007 | Khojastepour et al. | 455/562.1 |

OTHER PUBLICATIONS

May 2002 Scaglione et al., "Optimal Designs for Space-Time Linear Precoders and Decoders", IEEE Transactions on Signal Processing, vol. 50, No. 5, May 2002, pp. 1051-1064.
Aug. 2005 Bahrami et al., "MMSE-based MIMO precoder using partial channel information", IEEE International Conference on Wireless and Mobile Computing, Networking and Communications, Aug. 22-24, 2005, pp. 211-216.

(Continued)

*Primary Examiner*—Chieh M Fan
*Assistant Examiner*—Eva Y Puente
(74) *Attorney, Agent, or Firm*—Hollingsworth & Funk, LLC (57) ABSTRACT

A method of transmitting a transmit vector comprising symbols to be delivered within a resource unit from a transmitting station with one or more transmit antennas to one or more receiving stations with one or more receive antennas. The method comprises obtaining information on the state of channels between the one or more transmit antennas and the one or more receive antennas; and computing, on the basis of the channel states between the one or more transmit antennas and the one or more receive antennas, a covariance matrix $R_{nn}$, a combined channel matrix H, and a block-diagonal linear operator V of decoding matrices of the receiving stations. The transmit vector is multiplied with a precoding matrix P fulfilling the equations

$$(H^H V^H V H = \lambda I)P = H^H V^H$$

$$V_i(H_i P P^H H_i^H + R_{nn,i}) = P_i^H H_i^H, i=1 \ldots K$$

$$\text{trace}(P^H P) = P_{tr}$$

and corresponding performing filtering in the receiving station using a receiver filter corresponding to the block-diagonal linear operator V.

14 Claims, 3 Drawing Sheets

OTHER PUBLICATIONS

Feb. 2002 Fischer et al., "Tomlinson-Harashima precoding in space-time transmission for low-rate backward channel", Broadband Communications 2002, International Seminar on Access, Transmission, Networking, Feb. 19-21, 2002, pp. 71-76.

2004 Q. Spencer, A.L. Swindlehurst, M. Haardt, "Zero-Forcing Methods for Downlink Spatial Multiplexing in Multiuser MIMO Channels," IEEE Transactions on Signal Processing, vol. 52, No. 2, Feb. 2004, pp. 461-471.

2004 V. Stankovic and M. Haardt, "Multi-User MIMO Downlink Precoding for Users with Multiple Antennas", in Proceedings of the 12$^{th}$ meeting of the Wireless World Research Forum (WWRF), Toronto, ON, Canada, Nov. 2004, 6 pages.

* cited by examiner

PRECODING METHOD FOR TRANSMITTING INFORMATION IN A MIMO RADIO SYSTEM

FIELD OF THE INVENTION

The present invention relates to communications and more particularly to a method of transmitting a transmit vector comprising symbols to be delivered within a resource unit from a transmitting station with one or more transmit antennas to one or more receiving stations with one or more receive antennas, to a radio system, to a signal processing unit, to a transmitting station, to a computer program product and to a computer program distribution medium.

BACKGROUND OF THE INVENTION

The invention is related to utilization of multi-user channel, where a single transmitting station sends data to several receiving stations within the same resource unit. If a transmitting station has several antennas, it is possible to separate the users only by using the spatial properties of the channel. This results to significantly enhanced system throughput since the users do not have to be separated in time, frequency or code domain.

Recently, multiple input, multiple output (MIMO) wireless technologies have been getting a lot of attention. MIMO technology has been suggested for use in several application areas, including future cellular communications, vehicle communications, wireless local and wide area networks, and military communications.

MIMO technology has the ability to significantly increase channel capacity and at the same improve link reliability. The advantages of MIMO technologies are achieved through the use of spatial diversity. Data in a MIMO system is transmitted over a plurality of transmit antennas to a plurality of receive antennas in the receiver terminals. When multiple signals are transmitted over a number of channels simultaneously, the signals between the plurality of transmit and receive antennas fluctuate and fade independently. The transmitted data may be encoded in the transmitter with a specific space-time code and by performing a corresponding processing at the receiver, the underlying data may be appropriately extracted. Possibilities of such combined precoding and equalizer design are currently intensively studied.

For the case where each user has only a single receive antenna, various precoding schemes are available in the literature. For the more general case with multiple receive antennas per user, some schemes have been recently proposed. Examples of such prior art document comprise Q. H. Spencer, A. L. Swindlehurst, and M. Haardt, "Zero-Forcing Methods for Downlink Spatial Multiplexing in Multiuser MIMO Channels," IEEE Trans. Signal Processing, vol. 52, no. 2, pp. 461-471, February 2004, and V. Stankovic and M. Haardt, "Multi-User MIMO Downlink Precoding for users with multiple antennas," in Proceedings of the 12th meeting of the Wireless World Research Forum (WWRF), Toronto, ON, Canada, November 2004. However, the techniques proposed so far rely on ad-hoc designs stemming from the single receive antenna case and are therefore not optimum in the minimum mean square error (MMSE) sense.

BRIEF DESCRIPTION OF THE INVENTION

It is an object of the invention to provide an improved method for transmitting information from a transmitting station with multiple transmit antennas to a receiving station with multiple receive antennas.

According to an aspect of the invention, there is provided a method of transmitting a transmit vector comprising symbols to be delivered within a resource unit from a transmitting station with one or more transmit antennas to one or more receiving stations with one or more receive antennas, the method comprising: obtaining information on the state of channels between the one or more transmit antennas and the one or more receive antennas; computing, on the basis of the channel states between the one or more transmit antennas and the one or more receive antennas, a covariance matrix $R_{nn}$, a combined channel matrix H, and a block-diagonal linear operator V of decoding matrices of the receiving stations; precoding the transmit vector with a preceding matrix P fulfilling the equations $$(H^H V^H V H = \lambda I) P = H^H V^H \tag{1a}$$

$$V_i(H_i P P^H H_i^H + R_{nn,i}) = P_i^H H_i^H, i=1 \ldots K \tag{1b}$$

$$\text{trace}(P^H P) = P_{tr} \tag{1c}$$

and performing filtering in the receiving station using a receiver filter corresponding to the block-diagonal linear operator V.

According to an aspect of the invention, there is also a radio system comprising a transmitting station, and a receiving station, the transmitting station comprising a transmitter for transmission of a transmit vector including symbols for one or more receiving stations through one or more transmit antennas within a resource unit; the receiving station comprising a receiver for receiving a receive vector from the one or more transmit antennas through one or more receive antennas within a resource unit; the transmitter being further configured to compute, on the basis of the channel states between the one or more transmit antennas and the one or more receive antennas, a covariance matrix $R_{nn}$, a combined channel matrix H, and a block-diagonal linear operator V of decoding matrices of the receiving stations, and precode the transmit vector with a precoding matrix P fulfilling the equations 1(a) to 1(c).

According to an aspect of the invention, there is also provided a signal processing unit configured to generate a transmit vector comprising symbols to be delivered within a resource unit from a transmitting station with one or more transmit antennas to one or more receiving stations with one or more receive antennas, the unit being further configured to receive information on the state of channels between the one or more transmit antennas and the one or more receive antennas; compute, on the basis of the channel states between the one or more transmit antennas and the one or more receive antennas, a covariance matrix $R_{nn}$, a combined channel matrix H, and a block-diagonal linear operator V of decoding matrices of the receiving stations; precode the transmit vector with a precoding matrix P fulfilling the equations 1(a) to 1(c).

According to an aspect of the invention, there is also provided a transmitting station comprising: signal transmission means comprising a plurality of transmit antennas, and a signal processing unit configured to generate a transmit vector comprising symbols to be delivered within a resource unit from a transmitting station with one or more transmit antennas to one or more receiving stations with one or more receive antennas, the unit being further configured to receive information on the state of channels between the one or more transmit antennas and the one or more receive antennas; compute, on the basis of the channel states between the one or more transmit antennas and the one or more receive antennas, a covariance matrix $R_{nn}$, a combined channel matrix H, and a block-diagonal linear operator V of decoding matrices of the receiving stations; precode the transmit vector with a preceding matrix P fulfilling the equations 1(a) to 1(c).

According to an aspect of the invention, there is also provided a computer program product encoding a computer process of instructions for executing a computer process for transmitting a transmit vector comprising symbols to be delivered within a resource unit from a transmitting station with one or more transmit antennas to one or more receiving stations with one or more receive antennas, obtaining information on the state of channels between the one or more transmit antennas and the one or more receive antennas; computing, on the basis of the channel states between the one or more transmit antennas and the one or more receive antennas, a covariance matrix $R_{nn}$, a combined channel matrix H, and a block-diagonal linear operator V of decoding matrices of the receiving stations; preceding the transmit vector with a precoding matrix P fulfilling the equations 1(a) to 1(c) and performing filtering in the receiving station using a receiver filter corresponding to the block-diagonal linear operator V.

According to an aspect of the invention, there is also provided a computer program distribution medium readable by a computer and encoding a computer program of instructions for executing a computer process for estimating a noise and interference covariance matrix in a radio system, the process including: transmitting a transmit vector comprising symbols to be delivered within a resource unit from a transmitting station with one or more transmit antennas to one or more receiving stations with one or more receive antennas, obtaining information on the state of channels between the one or more transmit antennas and the one or more receive antennas; computing, on the basis of the channel states between the one or more transmit antennas and the one or more receive antennas, a covariance matrix $R_{nn}$, a combined channel matrix H, and a block-diagonal linear operator V of decoding matrices of the receiving stations; precoding the transmit vector with a preceding matrix P fulfilling the equations 1(a) to 1(c) and performing filtering in the receiving station using a receiver filter corresponding to the block-diagonal linear operator V.

Different embodiments of the invention provide several advantages. Multi-user interference is considerably reduced at the transmitter and significant improvements are achieved in the performance of the radio system. New improved information is introduced to the radio system and utilized in a smart and effective way.

BRIEF DESCRIPTION OF THE DRAWINGS

In the following, the invention will be described in greater detail with reference to the preferred embodiments and the accompanying drawings, in which

FIG. 2 illustrates

FIG. 3 illustrates

DETAILED DESCRIPTION OF THE INVENTION

The present invention is applicable to various different digital radio systems where mechanisms for channel state information are available, for example, TDMA, FDMA, CDMA radio systems, and different variants of them. The invention is especially suited for time division duplexing (TDD) systems. In the following, an advantageous embodiment of the data transmission system according to the invention is described in a configuration of a mobile communication system, without limiting the invention to the embodied radio system or the specific terms and elements used in the description.

Figure 1:
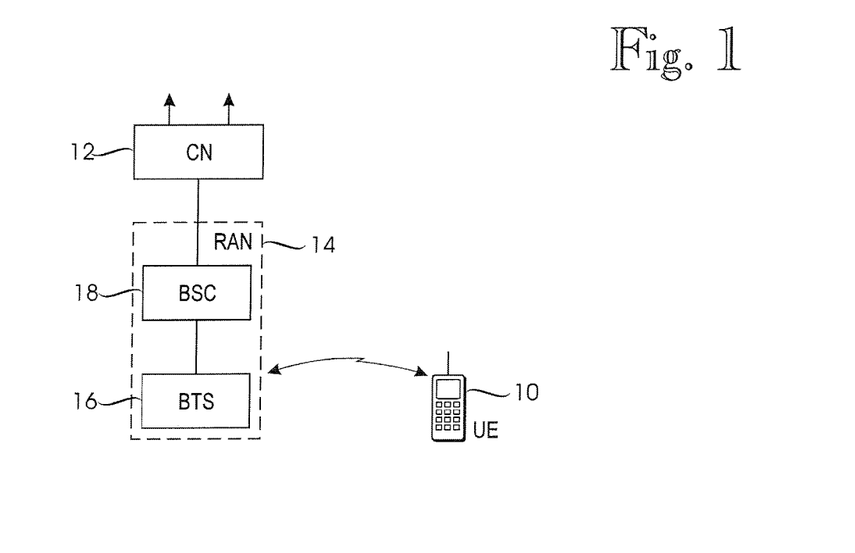
FIG. 1 shows an example of a data transmission system.

FIG. 1 illustrates user equipment 10 that is connected to the Core Network (CN) 12 through a Radio Access Network (RAN) 14. In radio access network, coverage area of base transceiver stations (BTS) 16 that belong to the same base station form a cell. The user may move from one cell to another, and the network hands the user over to a different cell according to the movement. Each base station comprises, or is connected to a base station controller (BSC) 18, which controls the radio frequencies and channels used by the base station. The base station controller is connected over a defined interface to a switching centre, and thus provides the interface between the radio access network 14 and the core network 12.

User equipment 10 of the communication system can be a simplified terminal for speech only or a terminal for diverse services. In the latter case the terminal acts as a service platform and supports loading and execution of various functions related to the services. User equipment comprises a mobile equipment and a subscriber identity module, that holds the subscriber identity, performs authentication algorithms, and stores authentication and encryption keys and other subscription information that is needed at the mobile station. The mobile equipment may be any equipment capable of communicating in a mobile communication system or a combination of several pieces of equipment, for instance a multimedia computer to which a card phone has been connected to provide a mobile connection.

It should be noted that only elements and units essential for understanding the invention are illustrated in FIG. 1. For a person skilled in the art it is clear that a digital radio system typically may comprise a plurality of elements that are not shown in FIG. 1.

Figure 2:
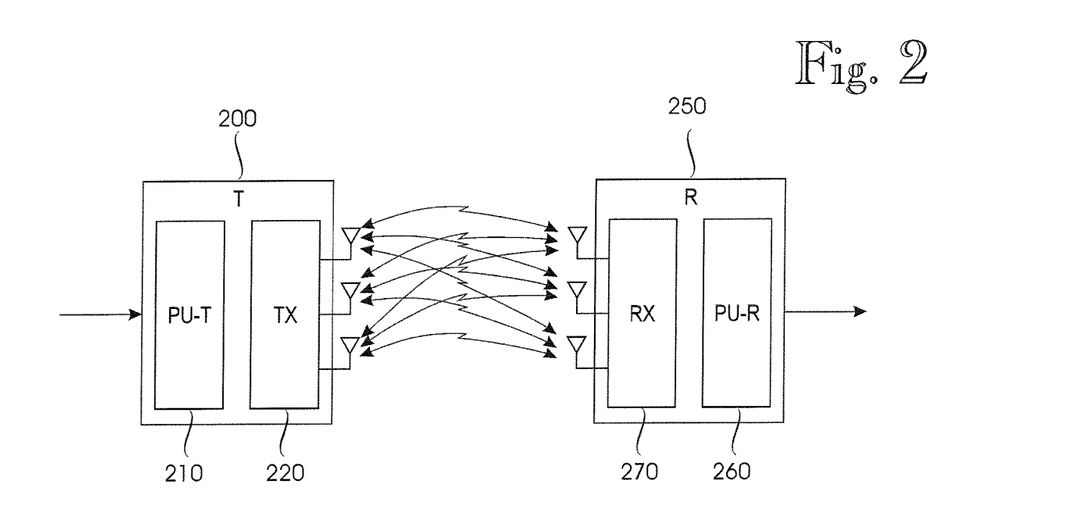
FIG. 2 illustrates an exemplary configuration of a transmitter and receiver.

In the following, the key system elements in implementation of the invention are described in more detail. FIG. 2 illustrates elementary configurations for a transmitter 200 of a transmitting station and a receiver 250 of a receiving station in a transmission path of the radio system. In terms of the embodiment of FIG. 1, the transmitting station may, for example, be a base station and the receiving station may be the user equipment.

The transmitter 200 comprises a transmitter signal processing unit 210, and signal transmitting means 220. The transmitter signal processing unit 210 performs signal processing on the bitstreams input to the transmitter 200 and generates a multiplicity transmit signals to the signal transmitting means 220. The signal transmitting means 220 comprise a plurality of transmitting antennas, for example, in form of an array antenna with one or more antenna elements. The transmit signals are transmitted from the plurality of transmit antennas over a corresponding plurality of transmission channels to a number of receiving stations. This transmission scheme is called spatial multiplexing because one data stream is multiplexed (divided) between multiple transmitting antennas and sent over separate spatial channels.

More specifically, according to the internal processes of the transmit station, the transmitter 200 receives a number of encoded binary data streams that comprise signals to for delivery to a number of mobile users within one resource unit. The transmitter signal processing unit 210 performs signal processing and feeds analog transmit signals to the signal transmitting means 220. The transmitter signal processing unit 210 is a device capable of performing systematic execution of operations upon data, and typically comprises functional units for symbol mapping, signal spreading, and burst generation. In symbol mapping coded bits are mapped into modulation symbols. A pre-defined spreading code is applied on the signal, and a burst is generated. The signal transmitting means 220 comprise a radio frequency part and a plurality of transmit antennas. The radio frequency part performs digital-to-analog conversion, upwards frequency conversion, filtering and amplification of signals such that they may be fed to the plurality of transmitting antennas.

Correspondingly, the receiver 250 comprises a receiver signal processing unit 260, and signal receiving means 270. The signal receiving means 270 comprise a plurality of transmitting antennas, for example, in form of an array antenna with one or more antenna elements. The signals are received from the plurality of transmit antennas over a corresponding plurality of transmission channels, and fed to the receiver signal processing unit 260. The receiver signal processing unit 260 demultiplexes the spatial streams, recovers the original data and outputs a received signal to the internal processed of the receiving station.

More specifically, a received signal is processed in a radio frequency (RF) part of the signal receiving means 270. The radio frequency part transfers the radio frequency signal to either intermediate frequency or to a base band frequency, converts the downconverted signal from analog to digital, samples the signal and feeds the digitized input samples to the receiver signal processing unit 260. The receiver signal processing unit 260 is a device capable of performing systematic execution of operations upon data. Corresponding to the transmission end, the receiver signal processing unit typically comprises the functional units for at least burst splitting, signal despreading, and integration to user data symbols, delay compensation and channel estimation. These result in channel-compensated symbols that are combined into a received signal. According to the invention, the receiver signal processing unit 260 comprises a filter that is used to determine and update the current multipath delay profile of the channel, compute a linear and thereby adjust the generation of the received signal such that the improved performance is achieved.

It should be noted that for conciseness, only elements necessary for disclosing the invention are described herein. The transmitting station and/or the receiving station typically comprises a transmitter and a receiver, such that the station is capable of two-way communication. Additionally, an interaction between the transmitter and the receiver of a station may be arranged such that information on the radio interface may be fed back from the receiver to the transmitter to be used as a basis for the computations utilizing the knowledge on the channel state. Alternatively, the transmitter may comprise uplink measurement functionality for obtaining knowledge on the channel state. A signal processing unit may be implemented as a single processor or as an integrated combination of several processors, or in the form of hardware components, such as integrated circuits, discrete components, or a combination of any of these, which is evident to one skilled in the art. The functional units are formed as logical entities by a combination of a shared or dedicated physical resource of the signal processing unit and a set of predefined algorithms necessary for execution of the operations for the functionality of the respective unit.

According to the invention, the transmit signal processing unit 220 according to the invention further comprises a precoder, i.e. a functional unit for precoding the transmit signals on the basis of knowledge of the communication channels between the transmitter and the receivers. The precoder thus comprises functionality for receiving defined information on the state of the communication channels, and functionality for computing a preceding matrix on the basis of the received information. Furthermore, the precoder also comprises a functionality for receiving transmit data containing symbols for users served within a resource unit and a functionality for multiplying the transmit data with the computed precoding matrix.

Figure 3:
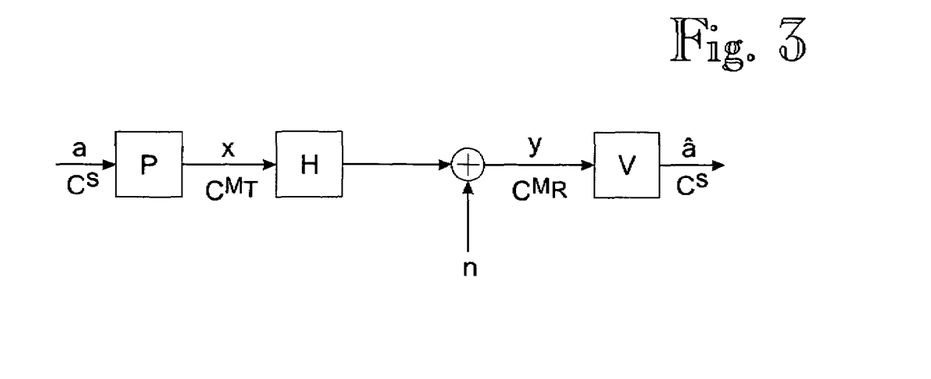
FIG. 3 illustrates the embodied data transmission system in complex baseband notation.

In the following, the linear precoding procedure and the use of the precoder and the filter will be described in more detail. The following expressions refer to frequency flat channels. In case of Orthogonal frequency-division multiplexing (OFDM) systems, the implementation can be seen as precoding on each resource unit. FIG. 3 illustrates the embodied system in complex baseband notation. In FIG. 3 it is assumed that the transmitter (in terms of FIG. 2, the transmitting station) has $M_T$ antennas and it serves K receivers (in terms of FIG. 2, receiving stations) within the same resource unit. A total number of $M_R$ receive antennas are distributed among these users according to $$M_R = \sum_{k=1}^{K} M_{R,k},$$

where $M_{R,k}$ denotes the number of antennas at the kth user. Let us furthermore assume that the kth user receives $S_k$ independent data streams, and $$S = \sum_{k=1}^{K} S_k$$

is the total number of streams to be transmitted.

The transmit vector a is denoted by $$a = [a_1^T, a_2^T, \ldots, a_K^T]^T \in C^S.$$

where $a_k \in C^{S_k}$ is the data vector containing the $S_k$ symbols for the kth user. We assume that the data symbols are normalized such that $E\{aa^H\} = I_S$.

The linear precoding step is expressed by premultiplication with the matrix $$P = [P_1, P_2, \ldots, P_K] \in C^{M_T \times S},$$

where the submatrix $P_k \in C^{M_T \times S_k}$ corresponds to user k. The transmit vector $x \in C^{M_T}$ is then given by x=Pa, and its average power is constrained by $$E\{\|x\|^2\} = \text{trace}(P^H P) = P_{tr}.$$

Furthermore, the physical transmission channel itself and the receiver noise are given as y=Hx+n. The combined channel matrix H is $$H = [H_1^T, H_2^T, \ldots, H_K^T] \in C^{M_R \times M_T},$$

where $H_k \in C^{M_{R,k} \times M_T}$ is the channel matrix of the kth user. The vector n denotes additive zero-mean receiver noise with covariance matrix $R_{nn}$. Additionally, $$n = [n_1^T, n_2^T, \ldots, n_K^T]^T \in C^{M_R},$$

where $n_k \in C^{M_{R,k}}$ is the noise vector at the kth user. Finally, we define $R_{nn,k} = E\{n_k n_k^H\}$.

At the receiver end of the transmission chain, the linear operator $V \in C^{S \times M_R}$ is applied to obtain â=Vy, which contains the estimates of the true transmitted data symbols. Since the users may reside at distinct locations, and hence are not able to perform cooperative receive processing, V is block-diagonal, i.e., $$V = \begin{bmatrix} V_1 & 0 & \cdots & 0 \\ 0 & V_2 & \cdots & 0 \\ \vdots & \vdots & \ddots & 0 \\ 0 & 0 & 0 & V_K \end{bmatrix} \in C^{S \times M_R},$$

where $V_k \in C^{S_k \times M_{R,k}}$ is the decoding matrix of the kth user.

The system output $\hat{a} \in C^S$ servers as an estimate for the original transmit vector a. It can be expressed as $\hat{a}$=VHPa+Vn, or equivalently, $$\hat{a} = [\hat{a}_1^T, \hat{a}_2^T, \ldots, \hat{a}_K^T]^T \in \text{:ds } C^S$$

$$\hat{a}_k = V_k H_k \sum_{l=1}^{K} P_l a_l + V_k n_k, \forall k=1,2,\ldots,K.$$

The number of data streams for each user, $S_k$, is chosen a-priori, and is not subject to prioritization. The choice must satisfy $S_k \leq M_{R,k}$ and $S_k \leq M_T$. The objective function is defined as $$E\{\|a-\hat{a}\|^2\} = F = F(P,V).',$$

whereby the optimization may be expressed as $\{P,V\}^{LMP}$=arg min F(P,V) $P \in C^{M_T \times S}$ $V \in C^{S \times M_R}$, block diagonal subject to tr($P^H P$)=$P_{tr}$.

By taking into account the equation for $\hat{a}_K$, we get $$\mathcal{F} = E\left\{\sum_{k=1}^{K} \left\| V_k H_k \sum_{l=1}^{K} P_l a_l + V_k n_k - a_k \right\|^2\right\}$$

$$= E\left\{\sum_k \left(\sum_{l,m} a_l^H P_l^H H_k^H V_k^H V_k K_k P_m a_m - \sum_l a_l^H P_l^H H_k^H V_k^H a_k + n_k^H V_k^H V_k n_k - \sum_m a_k^H V_k H_k P_m a_m + a_k^H a_k\right)\right\}.$$

where $\Sigma_i$ is used as an abbreviation for $\Sigma_{i-1}^K$. In the last equation, use has been made of the property that the signal and noise components are uncorrelated. The trace operator can now be applied to the scalar terms, and the expectation moved as far inside the equation as possible. Thus $$\mathcal{F} = \sum_k \left(\sum_{l,m} tr(P_l^H H_k^H V_k^H V_k K_k P_m E\{a_m a_l^H\}) - \sum_l tr(P_l^H H_k^H V_k^H E\{a_k a_l^H\}) - \sum_m tr(V_k H_k P_m E\{a_m a_k^H\}) + tr(V_k^H V_k E\{n_k n_k^H\}) + tr(E\{a_k a_k^H\})\right).$$

The expressions of the type $E\{a_m a_l^H\}$ evaluate to the identity matrix if m=l and the zero matrix otherwise. Additionally, we now use $R_{nn,k}$ as defined earlier. Hence, $$\mathcal{F} = 
(P,V) = \sum_k \left(\sum_l tr(P_l^H H_k^H V_k^H V_k H_k P_l) - tr(P_k^H H_k^H V_k^H) - tr(V_k H_k P_k) + tr(V_k^H V_k R_{nn,k}) + tr(I_{S_k})\right).$$

In order to find the optimum parameters P and V in the sense of the optimization expression, the Lagrangian multi-plier method will be applied. The modified objective function is $$L(P,V,\lambda) = F(P,V) + \lambda(\Sigma_k tr(P_k^H P_k) - P_{tr}),$$

where $\lambda \in R$ is the Lagrangian multiplier. Note that L(P, V, $\lambda$) is equivalent to the more detailed notation L($P_1, \ldots, P_K, V_1, \ldots, V_K, \lambda$).

Next the derivatives of L are computed with respect to $P_i$, $V_i$, and $\lambda$. These derivatives can be formed directly by using the convention that arranges the derivatives with respect to each matrix component in a new 'gradient' matrix. This method is not fully consistent, since the 'gradient' definition does not fulfill $f(x_0+\Delta x)=f(x_0)+(\text{grad } f)(x_0)\cdot\Delta x + O(\|\Delta x\|^2)$ due to dimensionality. For the specific purpose of setting the derivative to zero, the convention is useful. The mathematically rigorous way would be to express the objective function in terms of vec(P) and vec(V) instead of P and V, where vec(•) is the stacking operation. The gradient with respect to a vector argument is well defined and could then be used. This approach, however, makes the derivation unnecessarily complex while yielding the same result.

The arguments of L are complex-valued. The proper way to form the gradient is to treat the argument and its conjugate/conjugate transpose as independent variables. The derivative is then taken only with respect to the conjugate argument.

Under these conventions, also $\partial tr(A^H B)/\partial A^H = B^T$. The partial derivatives of L with respect to $P_i$, $V_i$, and $\lambda$ evaluate to $$\left(\frac{\partial \mathcal{L}}{\partial P_i^H}\right)^T = \sum_k H_k^H V_k^H V_k H_k P_i - H_i^H V_i^H + \lambda P_i$$

$$\left(\frac{\partial \mathcal{L}}{\partial V_i^H}\right)^T = \sum_l V_i H_i P_l P_l^H H_i^H - P_i^H H_i^H + V_i R_{nn,i}$$

$$\frac{\partial \mathcal{L}}{\partial \lambda} = \sum_{k=1}^{K} tr(P_k^H P_k) - P_{tr}.$$

In order to obtain a necessary condition on the optimum P and V, these equations have to be set simultaneously to zero. Using $$\Sigma_k H_k^H V_k^H V_k H_k = H^H V^H V H$$

$$\Sigma_i P_i P_i^H = PP^H,$$

the equations can be written as $$H^H V^H V H P_i - H_i^H V_i^H + \lambda P_i = 0_{M_T \times S_i}, i=1 \ldots K$$

$$V_i H_i PP^H H_i^H - P_i^H H_i^H + V_i R_{nn,i} = 0_{S_i \times M_{R,i}}, i=1 \ldots K$$

$$tr(P^H P) = P_{tr}.$$

Furthermore, the K equations in the first line can be aggregated by concatenating all columns next to each other. Extracting common factors, it can be concluded that:

$$(H^H V^H V H + \lambda I) P = H^H V^H \quad (1a)$$

$$V_i (H_i PP^H H_i^H + R_{nn,i}) = P_i^H H_i^H, i=1 \ldots K \quad (1b)$$

$$\text{trace}(P^H P) = P_{tr}. \quad (1c)$$

A direct solution of equations 1(a) to 1(c) is not easily possible. Realizing that equation 1(a) can be used to express P in terms of V, all occurrences of P can be eliminated from the set of equations. The problem can then be rewritten in a least-squares formulation $$\{V_1,...,V_K, \lambda\}^{LMP} =$$

$$\arg\min_{\substack{V_i \in C^{S_i \times M_{R,i}}, \forall i \\ \lambda \in R}} \left( \sum_{k=1}^{K} \|V_i(H_i P_V P_V^H H_i^H + R_{nn,i}) - P_{V,i}^H H_i^H\|_F^2 + \right.$$

$$\left. |tr(P_V^H P_V) - P_{tr}|^2 \right)$$

where $P_V$ is the specific P as of function of V and $\lambda$ that results from equation (1a), and $\|\bullet\|_F$ denotes the Frobenius matrix norm. Equation (1b) lends itself to numerical methods well known to a person skilled in the art. For initial guess off the free variables, successive minimum mean square error (S-MMSE) or block diagonalization (BD) schemes can be used as initial guesses for V.

It can be seen that for a fixed P, the above equations show that $V_i$ is a well-known linear MMSE receiver for user i. More specifically, in the receiving end effective channel may be estimated as $$H_{eq,i} = H_i P_i$$

and the interference plus noise covariance matrix $$R_{eq,i} = H_i \left( \sum_{\substack{k=1 \\ k \neq i}}^{K} P_k P_k^H \right) H_i^H + R_{nn,i}.$$

These may be used to compute the standard LMMSE receiver filter $$\hat{V}_i = H_{eq,i}^H (H_{eq,i} H_{eq,i}^H + R_{eq,i})^{-1}.$$

Hence, $V_i$ need not be forwarded from the transmitting station to the receiving station, but their components can be estimated locally. The absence of need for additional over-the-air interaction in order to achieve the improved performance is a considerable advantage of the invention.

Figure 4:
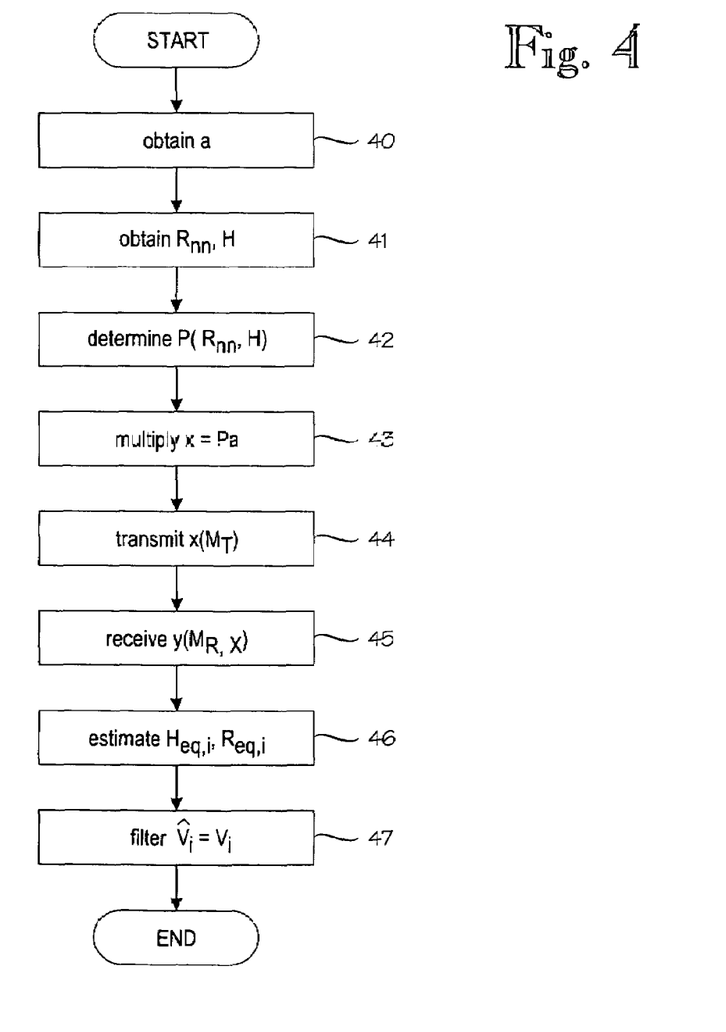
FIG. 4 illustrates an example of the method for transmitting information from a transmitting station to a receiving station.

FIG. 4 illustrates the steps of the embodied method for transmitting information from a transmitting station to a receiving station. It should be noted that the method illustrates the operation of the whole data transmission system, and therefore shows functions from the point of view of the receiving station as well as of the transmitting station. In step 40, the transmitting station obtains a transmit vector a comprising transmit vectors for K receiving stations, each vector comprising the symbols for a receiving station. In step 41, the transmitting station obtains the channel state information in form of the covariance matrix $R_{nn}$ and the combined channel matrix H. Channel state information may be obtained via feedback from the receiver branch, derived from uplink measurements, a predefined values may be utilized. Typically $R_{nn}$ is obtained via feedback, H either via feedback or, in case of time-division duplexing (TDD) systems also from uplink measurements. Definitions of the covariance matrix and the combined channel matrix have been widely discussed in the field and are, as such, generally known to a person skilled in the art.

In step 42 the transmitting station calculates a preceding matrix P that is minimum mean-square error (MMSE) optimal. MMSE relates to an estimator having estimates with the minimum mean squared error possible. MMSE estimators are commonly described as optimal. P is calculated used the equations (1(a), 1(b), and 1(c)). In step 43, the transmit vector a is multiplied with the precoding matrix P and in step 44 the precoded transmit vector x is transmitted via the $M_T$ transmit antennas of the transmitting station. In step 45, the receiver vector y is received with the multiple receive antennas of the K receiving stations. In step 46, the receiving station estimates its effective channel matrix and the interference plus noise covariance matrix, and uses them to compute a standard linear minimum mean-square error (LMMSE) receiver filter $\hat{V}_i = H_{eq,i}^H (H_{eq,i} H_{eq,i}^H + R_{eq,i})^{-1}$. In step 47, the receiving station performs filtering by $\tilde{V}_i = V_i$ in order to generate soft bits for forward error correction (FEC) decoding.

The invented solution provides a significantly improved performance over the existing techniques for transmitting information from a transmitting station with multiple transmit antennas to a receiving station with multiple receive antennas. In order to compare performance of the invented solution with the prior art BD and S-MMSE solutions, Monte Carlo simulations for cases with single data stream per user were carried out. This was implemented by choosing $S_k=1$, $S_k=1$, $\forall k$ for $L_k$ for the invented method, and applying dominant eigenmode transmission for the prior art methods.

Figure 5:
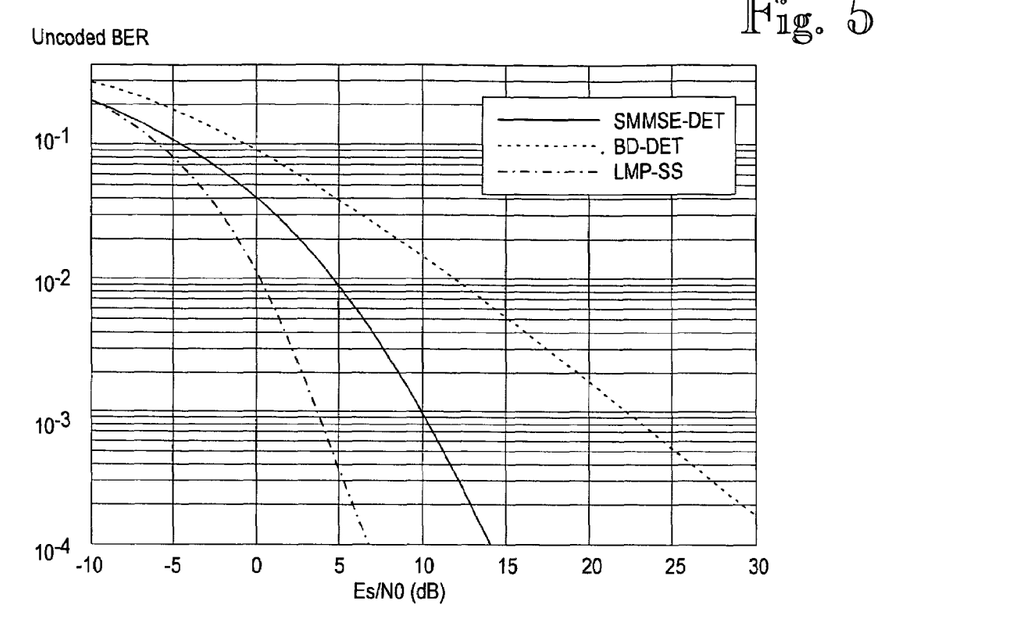
FIG. 5 illustrates simulation results on the uncoded bit error rate curves for the precoding methods under comparison.

FIG. 5 shows uncoded bit error rate curves for the preceding methods under comparison. The curves have been generated for a setup with K=3 users having 1, 2, and 3 receive antennas, respectively, and with 6 transmit antennas. For the plot, the bit error rates have been averaged over all users. The channel realizations have been drawn randomly with independent Rayleigh fading, where each element of the channel matrix has unit average power. The noise has been assumed to be independent between all receive antennas. On each data stream, random QPSK symbols with unit power have been transmitted. The receiver noise has been assumed to be complex Gaussian with power $N_0 = \sigma_N^2$. Furthermore, $E_S$ is defined as the average transmit power per data symbol.

Figure 6:
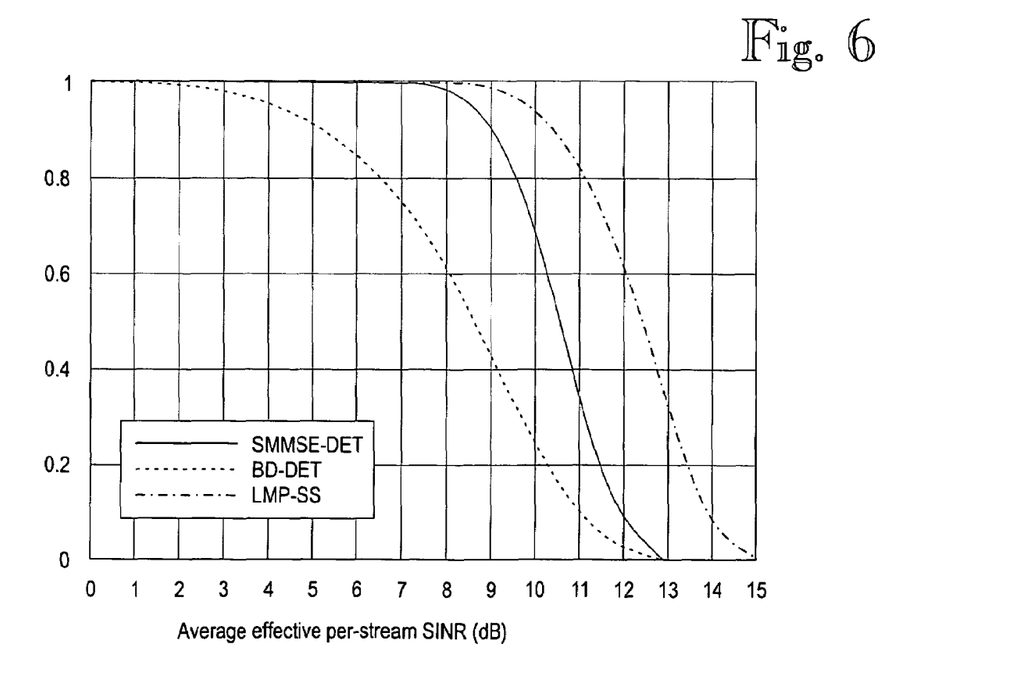
FIG. 6 illustrates simulation results on the complementary cumulative distribution function of the average per-stream Signal to Interference-plus-Noise Ratio of an equivalent channel a→â.

FIG. 6 shows the complementary cumulative distribution function (CCDF) of the average per-stream Signal to Interference-plus-Noise Ratio (SINR) of the equivalent channel $a \rightarrow \hat{a}$. For a given channel realization $(H, R_{nn})$, the precoding and decoding matrices P and V are used to express the equivalent channel as $(H_{eq}, R_{nn,eq}) = (VHP, VR_{nn}V^H)$. The $SINR_k$ for the kth user and the average value $SINR_{db}$ over all users are then readily available as $$SINR_k = \frac{|(H_{eq})_{k,k}|^2}{(R_{nn,eq})_{k,k} + \sum_{\substack{l=1 \\ l \neq k}}^{K} |(H_{eq})_{k,l}|^2},$$

$$SINR_{dB} = 1/K \sum_k 10 \text{ dB} \cdot \log_{10}(SINR_k).$$

The same system parameters as for FIG. 5 have been used and $E_S/N_0$ has been fixed at 5 dB. For each channel realization, a single sample of $SINR_{db}$ was computed, which was averaged over all users. A total of 10000 of these samples for each precoding method have been used to produce the plot.

Both FIGS. 5 and 6 show that the invented method achieves a significantly improved performance when compared to previously existing methods. The $E_S/N_0$ gain at a bit error rate of $10^{-2}$ is approximately 4.5 dB over S-MMSE and 11.6 dB over BD. Using the invented solution, the 10% outage value for the average per-stream SINR is 1.4 dB higher than for S-MMSE and 5.2 higher than for BD.

In an aspect, the invention provides a computer program product encoding a computer program of instructions for executing a computer process.

In another aspect, the invention provides a computer program distribution medium readable by a computer and encoding a computer program of instructions for executing a computer process.

The distribution medium may include a computer readable medium, a program storage medium, a record medium, and/or a computer readable memory.

Embodiments of the computer process are shown and described in conjunction with FIG. 4. The computer program may be executed in the signal processing unit of the transmitter and/or the receiver.

Even though the invention is described above with reference to an example according to the accompanying drawings, it is clear that the invention is not restricted thereto but it can be modified in several ways within the scope of the appended claims.

The invention claimed is:

1. A method of transmitting a transmit vector comprising symbols to be delivered within a resource unit from a transmitting station with one or more transmit antennas to one or more receiving stations with one or more receive antennas, the method comprising:

obtaining information on states of channels between the one or more transmit antennas and the one or more receive antennas;

computing, on the basis of the states of the channels between the one or more transmit antennas and the one or more receive antennas, a covariance matrix $R_{nn}$, a combined channel matrix H, and a block-diagonal linear operator V of decoding matrices of the one or more receiving stations;

precoding the transmit vector with a precoding matrix P fulfilling the equations $$(H^H V^H V H + \lambda I)P = H^H V^H \quad (1a)$$

$$V_i(H_i P P^H H_i^H + R_{nn,i}) = P_i^H H_i^H, i=1\ldots K \quad (1b)$$

$$\operatorname{trace}(P^H P) = P_{tr} \quad (1c)$$

where superscript H stands for conjugate transpose, $\lambda$ denotes lagrangian multiplier, $R_{nn,i}$ noise covariance matrix for the i:th user and $P_{tr}$ is a power constraint;

performing filtering in the one or more receiving stations using a receiver filter corresponding to the block-diagonal linear operator V.

2. A method according to claim 1, further comprising obtaining information on the state of channels through feedback.

3. A method according to claim 1, further comprising obtaining information on the state of channels through uplink measurements.

4. A radio system comprising a transmitting station, and a receiving station, the transmitting station comprising a transmitter for transmission of a transmit vector including symbols for one or more transmit antennas within a resource unit;

the receiving station comprising a receiver for receiving a receive vector from the one or more transmit antennas through one or more receive antennas within a resource unit;

the transmitter being further configured to compute, on the basis of states of channels between the one or more transmit antennas and the one or more receive antennas, a covariance matrix $R_{nn}$, a combined channel matrix H, and a block-diagonal linear operator V of decoding matrices of the receiving stations, and precode the transmit vector with a precoding matrix P fulfilling the equations $$(H^H V^H V H + \lambda I)P = H^H V^H \quad (1a)$$

$$V_i(H_i P P^H H_i^H + R_{nn,i}) = P_i^H H_i^H, i=1\ldots K \quad (1b)$$

$$\operatorname{trace}(P^H P) = P_{tr} \quad (1c)$$

where superscript H stands for conjugate transpose, $\lambda$ denotes lagrangian multiplier, $R_{nn,i}$ noise covariance matrix for the i:th user and $P_{tr}$ is a power constraint;

the receiver being further configured to perform filtering in the receiving station using a receiver filter corresponding to the block-diagonal linear operator V.

5. A system according to claim 4, wherein the transmitting station comprises also a receiver, and the transmitter is configured to obtain information on the state of channels through feedback from the receiver.

6. A system according to claim 4, wherein the transmitter is configured to obtain information on the state of channels through uplink measurements.

7. A signal processing unit configured to receive information and generate a transmit vector comprising symbols to be delivered within a resource unit from a transmitting station with one or more transmit antennas to one or more receiving stations with one or more receive antennas, the signal processing unit being further configured to:

receive information on states of channels between the one or more transmit antennas and the one or more receive antennas;

compute, on the basis of the states of the channels between the one or more transmit antennas and the one or more receive antennas, a covariance matrix $R_{nn}$, a combined channel matrix H, and a block-diagonal linear operator V of decoding matrices of the one or more receiving stations;

precode the transmit vector with a precoding matrix P fulfilling the equations $$(H^H V^H V H + \lambda I)P = H^H V^H \quad (1a)$$

$$V_i(H_i P P^H H_i^H + R_{nn,i}) = P_i^H H_i^H, i=1\ldots K \quad (1b)$$

$$\operatorname{trace}(P^H P) = P_{tr} \quad (1c)$$

where superscript H stands for conjugate transpose, $\lambda$ denotes lagrangian multiplier, $R_{nn,i}$ noise covariance matrix for the i:th user and $P_{tr}$ is a power constraint.

8. A signal processing unit according to claim 7, wherein the signal processing unit is configured to obtain information on the states of the channels through feedback from the receiver.

9. A signal processing unit according to claim 7, wherein the signal processing unit is configured to obtain information on the states of the channels through uplink measurements.

10. A transmitting station comprising:

signal transmission means comprising one or more transmit antennas; and a signal processing unit configured to receive information and generate a transmit vector comprising symbols to be delivered within a resource unit from the transmitting station with the one or more transmit antennas to one or more receiving stations with one or more receive anten nas, the signal processing unit being further configured to:

receive information on states of channels between the one or more transmit antennas and the one or more receive antennas;

compute, on the basis of the states of the channels between the one or more transmit antennas and the one or more receive antennas, a covariance matrix $R_{nn}$, a combined channel matrix H, and a block-diagonal linear operator V of decoding matrices of the one or more receiving stations;

precode the transmit vector with a precoding matrix P fulfilling the equations $$(H^H V^H V H + \lambda I) P = H^H V^H \quad (1a)$$

$$V_i(H_i P P^H H_i^H + R_{nn,i}) = P_i^H H_i^H, i=1 \ldots K \quad (1b)$$

$$\text{trace}(P^H P) = P_{tr} \quad (1c)$$

where superscript H stands for conjugate transpose, $\lambda$ denotes lagrangian multiplier, $R_{nn,i}$ noise covariance matrix for the i:th user and $P_{tr}$ is a power constraint.

11. A transmitting station according to claim 10, wherein the transmitting station is a base station for a radio system.

12. A transmitting station according to claim 11, wherein the transmitting station is a base station for a time division duplexing radio system.

13. A non-transitory computer program distribution medium readable by a computer and encoding a computer program of instructions for executing a computer process, the process including:

transmitting a transmit vector comprising symbols to be delivered within a resource unit from a transmitting station with one or more transmit antennas to one or more receiving stations with one or more receive antennas, obtaining information on states of channels between the one or more transmit antennas and the one or more receive antennas;

computing, on the basis of the states of the channels between the one or more transmit antennas and the one or more receive antennas, a covariance matrix $R_{nn}$, a combined channel matrix H, and a block-diagonal linear operator V of decoding matrices of the one or more receiving stations;

precoding the transmit vector with a precoding matrix P fulfilling the equations $$(H^H V^H V H + \lambda I) P = H^H V^H \quad (1a)$$

$$V_i(H_i P P^H H_i^H + R_{nn,i}) = P_i^H H_i^H, i=1 \ldots K \quad (1b)$$

$$\text{trace}(P^H P) = P_{tr} \quad (1c)$$

where superscript H stands for conjugate transpose, $\lambda$ denotes lagrangian multiplier, $R_{nn,i}$ noise covariance matrix for the i:th user and $P_{tr}$ is a power constraint;

performing filtering in the receiving stations using a receiver filter corresponding to the block-diagonal linear operator V.

14. The non-transitory computer program distribution medium of claim 13, the distribution medium comprising at least one of a computer readable medium, a program storage medium, a record medium, and a computer readable memory.

* * * * *